United States Patent [19]
King

[11] 3,708,006
[45] Jan. 2, 1973

[54] TIRE COOLING DEVICE AND METHOD OF COOLING

[75] Inventor: Calvin J. King, Muskego, Wis.

[73] Assignee: Perfex Corporation, Milwaukee, Wis.

[22] Filed: Dec. 14, 1970

[21] Appl. No.: 97,873

[52] U.S. Cl.............................152/153, 301/6 CF
[51] Int. Cl...............................................B60c 19/06
[58] Field of Search...................152/153; 301/6 CF

[56] References Cited

UNITED STATES PATENTS

| | | | |
|---|---|---|---|
| 1,780,306 | 11/1930 | Manly | 152/153 |
| 1,956,739 | 5/1934 | Gollert | 152/153 |
| 2,041,457 | 5/1936 | Cautley | 301/6 CR |
| 2,538,563 | 1/1951 | Isham | 152/153 |
| 1,377,011 | 5/1921 | Fukuda | 152/153 |
| 3,599,694 | 8/1971 | Bezbatchenko | 152/153 |
| 2,948,321 | 8/1960 | Mote | 152/153 |

Primary Examiner—Gerald M. Forlenza
Assistant Examiner—D. W. Keen
Attorney—V. Robins Tate, Harold W. Grothman and Spencer B. Michael

[57] ABSTRACT

A cooling device and method for cooling a rotating wheel that has an outer periphery generating heat as it contacts another surface. The cooling device is a sealed tubular member partially filled with a volatile liquid that vaporizes as it contacts heat from the outer periphery of the wheel. The vapor rises to an opposite end of the tubular member where it condenses as it is cooled and returns to the first end of the tubular member due to centrifugal force of the rotating wheel. This cycle repeats and is a continuous cooling process. The tubular member may be a conventional capillary heat pipe extending through the rim of a vehicle wheel so the first end absorbs tire heat and the other end rejects heat to the air.

6 Claims, 2 Drawing Figures

PATENTED JAN 2 1973　　　　　　　　　　　　　　　　　　3,708,006

Inventor
Calvin J. King
By Harold N. Grotheer
Attorney

TIRE COOLING DEVICE AND METHOD OF COOLING

BACKGROUND OF THE INVENTION

This invention relates to the art of cooling the surfaces of rotating members and, in particular, to the art of cooling rotating vehicular tires with a device such as a heat pipe.

Overheating of rotating members has been recognized in the past as a major or contributing cause of dangerous conditions that result in accidents. The recognition of this fact has resulted in the expenditure of vast sums for materials research and devices for cooling or for warning of an overheated condition. One of the areas of greatest emphasis is the field of rotating vehicular wheels; this includes automotive vehicles as well as special vehicles, such as trucks, heavy equipment, racing cars and the like. Most of these vehicles have pneumatic tires mounted on metal rims; the continuous flexure of the tire as the tire rolls on a surface produces friction that in turn results in heat. Heavy loads, increased speed and underinflated 'extra-cushion' tires will increase the heat generated under normal conditions. Of course, all of these factors are affected by the ambient temperature that determines the starting point for other heat producing conditions.

Numerous devices have been patented to alleviate the thermal problems mentioned above. The most pertinent related patent uncovered in a search of the art appears to be U. S. Pat. No. 1,956,739 "Cooling Device For Tires" dated May 1, 1934. a recent analysis of this patented design indicates that it is totally inadequate as a tire cooler under present day conditions.

OBJECTS AND SUMMARY OF THE INVENTION

It is an object of the invention to provide an efficient cooling system for a rotating member.

It is another object of the invention to provide a novel, improved cooling system for a pneumatic tire located on a wheel of a vehicle.

It is an additional object of the invention to utilize a heat pipe to absorb heat near the outer periphery of a rotating member and to reject heat at an interior end of the heat pipe toward the center of the rotating member.

It is a further object of the invention to utilize an elongated pipe containing a vaporizable fluid to absorb heat from a pneumatic tire with one end of the elongated pipe, to reject heat to the atmosphere on the other end of the elongated pipe located toward the interior of the vehicular wheel, and to return condensed fluid to the first end of the elongated pipe by using the centrifugal force of a rotating vehicular wheel.

A final and more specific object is to greatly accelerate heat dissipation from large vehicular tires and therefore substantially increase allowable loads and speeds.

In view of the above objects, this invention provides a cooling system for a rotating member. In particular, it is suited for cooling pneumatic tires that are mounted on metal rims to form rotatable vehicular wheels. An essential element of this cooling system is an enclosed, elongated pipe extending through and mounted on the metal rim. The pipe is partially filled with a vaporizable fluid while substantially all other matter is evacuated. One end of the pipe extends into the interior of the pneumatic tire and is specially designed as the heat absorbing end. The other end of the pipe extends inwardly from the metal rim and is specially designed as a heat rejecting end. The heat rejecting end may have external fins to enhance heat transfer to the atmosphere. The enclosed vaporizable fluid is in a liquid state adjacent the interior of the pneumatic tire until heat from the tire vaporizes it. The vapor flows to the other end of the pipe where the heat is rejected to the atmosphere and the vapor condenses. The condensed liquid returns to the heat absorbing end of the pipe by centrifugal force as the wheel rotates and the cycle repeats. The pipe may have an interior wick, as in a conventional heat pipe, extending between ends of the pipe to enhance heat flow by capillary return, particularly when the wheel is not rotating.

DESCRIPTION OF THE PREFERRED EMBODIMENT

Figure 1:
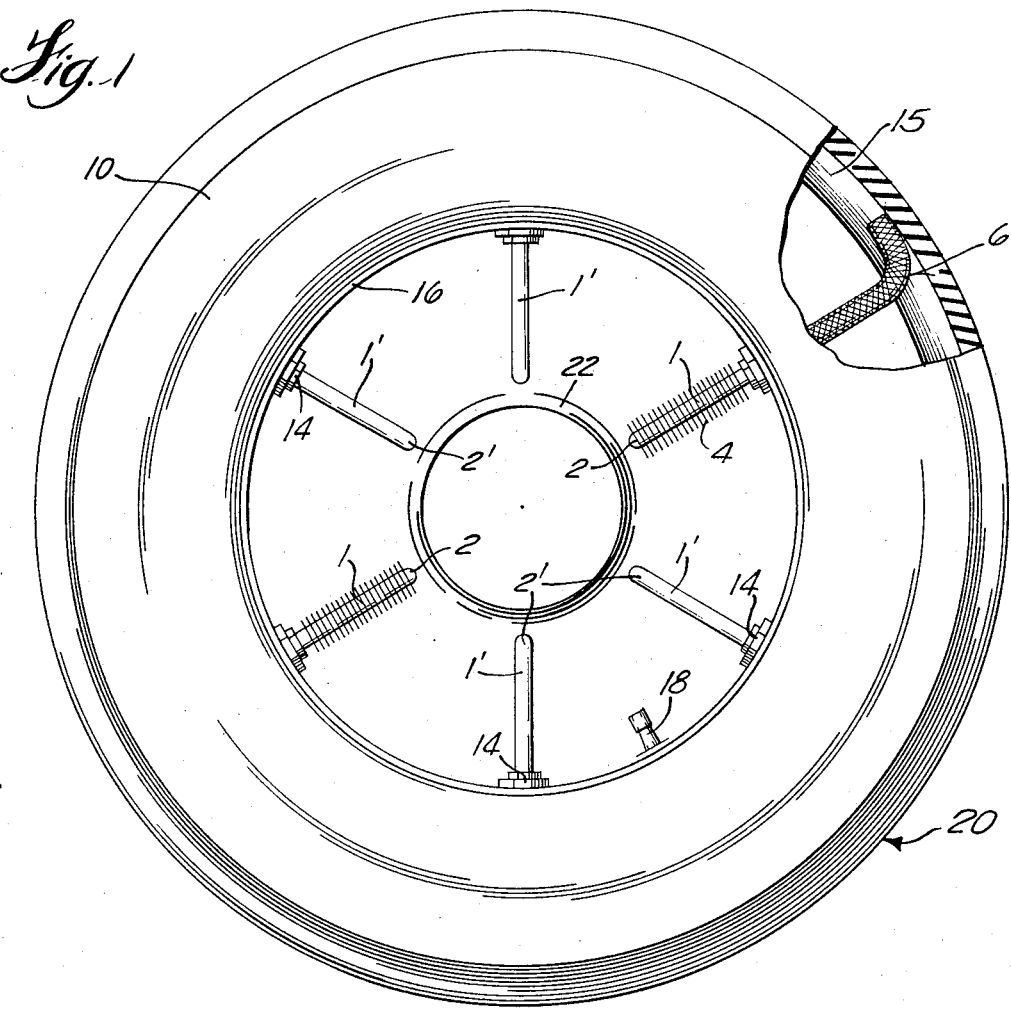
FIG. 1 is a view of a vehicular wheel utilizing the cooling system of the subject invention and having a section broken away to show the interior configuration of the cooling device within the pneumatic tire.

FIG. 1 shows one embodiment of the invention in which the cooling system is mounted on a vehicle wheel 20 that has a pneumatic tire 10 mounted on a metal rim 16. Metal rim 16 is joined to radial spokes or support members (not shown) that radiate outwardly from a hub portion 22. The cooling system consists of an enclosed metal pipe 1 that has a heat rejecting or condenser end 2 and a heat absorbing or evaporator end 6. Metal pipe 1 is constructed of material having good heat transfer characteristics such as copper, steel, stainless steel or their alloys. The heat rejecting end 2 may have metal fins 4 mounted thereon to enhance the cooling effect. Metal pipe 1' illustrates an installation with no additional fins on heat rejecting end 2'. A fastener assembly 14 secures metal pipe 1 to the metal rim 16. A conventional air valve assembly 18 is attached to metal rim 16 also. In general, wheel 20 is conventional for the particular truck, automobile, racing car, heavy equipment or other vehicle except for the attachment of the inventive cooling system.

Figure 2:
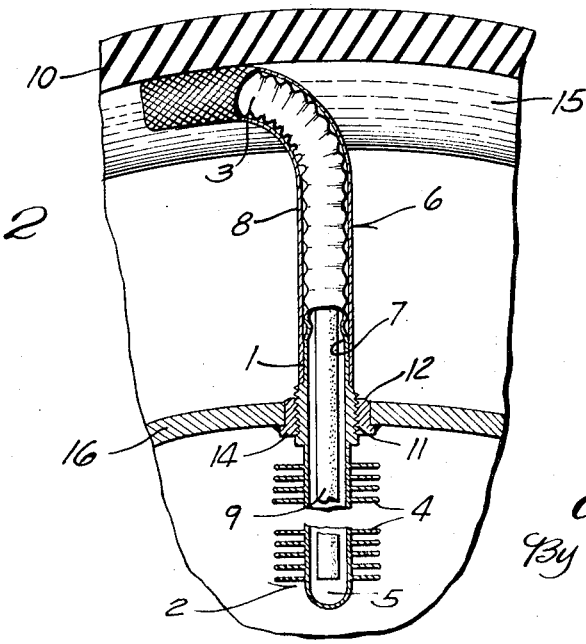
FIG. 2 is an enlarged sectional view of the section broken away in FIG. 1 to show the interior configuration of the cooling device within a portion of a pneumatic tire.

FIG. 2 shows an enlarged sectional view of the cooling system when it is mounted on metal rim 16 that supports pneumatic tire 10. Cooling pipe 1 has a threaded portion 11 which upon installation engages threaded bushing 12 that is welded into a hole in the rim 16.

Cooling pipe 1 has heat rejecting end 2 that contains vapor 5 in the internal enclosed area for pipe 1. Externally, cooling fins 4 extend from the outer surface of pipe 1. Heat absorbing end 6 of pipe 1 has a protective metallic flexible braided sheath 8 covering the inner container 7, a metallic bellows of stainless steel or the like. Hose 8 holds the metal bellows 7 in position so that the bellows 7 does not become unduly elongated due to pressure even though it is flexible. A cooling fluid 3 such as water, methyl alcohol, ammonia, freon or an anti-freeze solution of water-glycol or water-alcohol, or a combination thereof, is enclosed within the heat absorbing end 6 in normal operation. A woven liner or wick 9 may extend between the ends 2 and 6 of cooling pipe 1 to enhance fluid flow as will be described hereafter. A sufficient amount of water 15 or anti-freeze solution is placed within tire 10 so that the heat from the interior surface of the tire is distributed and readily transmitted to the heat absorbing end 6 of cooling pipe 1.

The method of cooling utilized with the heretofore described device is as follows:

1. Heat from the internal surface of tire 10 is transmitted to the water-like material 15 and external surface 8 of heat absorbing end 6.
2. Heat is transmitted from the external surface 8 to the inner container 7 and cooling fluid 3. Cooling fluid 3 is normally held in the heat absorbing end 6 of cooling pipe 1 due to centrifugal force as wheel 20 rotates.
3. Cooling fluid 3 is vaporized as the temperature increases. The vapor 5 flows toward the heat rejecting end 2 of cooling pipe 1.
4. Vapor 5 condenses as the heat exchange surface of the heat rejecting end 2 of cooling pipe 1 cools vapor 5.
5. Condensed vapor or liquid 3 is heavier than the vapor 5 so the centrifugal force of rotating wheel 20 moves the liquid 3 to the heat absorbing end 6. A wick 9 may be added to enhance return flow of liquid 3 by capillary action, particularly when wheel 20 is not rotating.
6. The cycle repeats.

The steps outlined in the above method of cooling provide a continuous and efficient cooling process for rotating members. It will be apparent to those skilled in the art that problems with excess heat generally increase with the speed of the rotating member and that increased speed will provide increased efficiency for this process. This is due to increased heat rejection from the air surface exposed on the heat rejection end 2 of the elongated pipe 1 and greater centrifugal force to speed up the return of cooling fluid 3 in the heat exchange cycle.

The specific embodiment shown and described heretofore has been limited generally to a vehicular wheel with individual cooling devices mounted on the metal rim. It should be understood that individual or multiple mountings in other locations on rotating members are possible. Therefore, the specific embodiment is merely representative of the invention and the appended claims should be interpreted in light of the full scope and spirit of the invention.

I claim:

1. A pneumatic tire cooling device for a wheel rim mounted tire, said device comprising:
   a. an elongated tubular housing having closed ends, an elongated heat radiating inner end portion and a flexible heat absorbing outer end portion;
   b. means intermediate the ends of said tubular housing mounting said housing in a wheel rim in such manner that said heat radiating inner end portion projects generally radially inwardly from the rim, and said flexible outer end portion projects generally radially outwardly of the rim within a tire thereon and terminates adjacent the inner surface of the tread portion of the tire;
   c. and a volatile liquid in said housing arranged to vaporize at said heat absorbing end portion of the tube responsive to heat generated in the tread portion of the tire, and to condense in said heat radiating end portion radially inwardly of said rim.

2. The pneumatic tire cooling device defined in claim 1, characterized by a plurality of spaced cooling fins projecting radially outwardly from said heat radiating end portion in radially inwardly spaced relation to said rim.

3. The pneumatic tire cooling device defined in claim 1, characterized by an elongated wick element in said housing extending from said heat radiating end portion to said heat absorbing end portion.

4. The pneumatic tire cooling device defined in claim 1 in which said flexible heat absorbing end portion is formed to provide a bellows, characterized by a flexible cover on said bellows to hold said bellows against longitudinal expansion.

5. The pneumatic tire cooling device defined in claim 1 in which said heat radiating portion is rigid, characterized by a plurality of longitudinally spaced annular cooling fins projecting radially outwardly of said heat radiating portion in radially inwardly spaced relation to said rim.

6. The pneumatic tire cooling device defined in claim 5 in which said flexible heat absorbing end portion is formed to provide a bellows, characterized by a flexible cover on said bellows to hold said bellows against longitudinal expansion, and an elongated wick element in said housing extending from said heat radiating end portion to said heat absorbing end portion.

* * * * *